(12) United States Patent
Smith et al.

(10) Patent No.: US 8,308,190 B2
(45) Date of Patent: Nov. 13, 2012

(54) BUCKLE AIRBAG

(75) Inventors: Paul Michael Smith, Davison, MI (US); Christopher Joe Kranz, Troy, MI (US)

(73) Assignee: TK Holdings Inc., Auburn Hills, MI (US)

( * ) Notice: Subject to any disclaimer, the term of this patent is extended or adjusted under 35 U.S.C. 154(b) by 90 days.

(21) Appl. No.: 12/975,152

(22) Filed: Dec. 21, 2010

(65) Prior Publication Data

US 2011/0148081 A1 Jun. 23, 2011

Related U.S. Application Data

(60) Provisional application No. 61/289,279, filed on Dec. 22, 2009.

(51) Int. Cl.
*B60R 21/18* (2006.01)
(52) U.S. Cl. ..................................... 280/733
(58) Field of Classification Search .............. 280/730.1, 280/733, 739, 740, 801.1
See application file for complete search history.

(56) References Cited

U.S. PATENT DOCUMENTS

| 3,682,498 | A | * | 8/1972 | Rutzki | 280/733 |
| 3,791,670 | A | * | 2/1974 | Lucore et al. | 280/733 |
| 3,865,398 | A | * | 2/1975 | Woll | 280/733 |
| 3,874,694 | A | * | 4/1975 | Stephenson | 280/733 |
| 3,905,615 | A | * | 9/1975 | Schulman | 280/730.1 |
| 3,948,541 | A | * | 4/1976 | Schulman | 280/733 |
| 4,342,483 | A | * | 8/1982 | Takada | 297/488 |
| 5,162,006 | A | * | 11/1992 | Yandle, II | 441/96 |
| 6,336,657 | B1 | * | 1/2002 | Akaba et al. | 280/733 |
| 7,980,590 | B2 | * | 7/2011 | Foubert et al. | 280/733 |
| 2003/0168837 | A1 | * | 9/2003 | Schneider et al. | 280/733 |
| 2005/0067820 | A1 | * | 3/2005 | Keeslar et al. | 280/733 |
| 2007/0108750 | A1 | * | 5/2007 | Bauer et al. | 280/740 |
| 2010/0025972 | A1 | * | 2/2010 | Nezaki | 280/730.1 |

* cited by examiner

*Primary Examiner* — Paul N Dickson
*Assistant Examiner* — Robert A Coker
(74) *Attorney, Agent, or Firm* — Foley & Lardner LLP (57) ABSTRACT

An occupant safety mechanism for an occupant of a vehicle includes a buckle assembly, an airbag cushion, an inflator, and webbing. The airbag cushion is coupled to the buckle assembly, such as in a buckle assembly housing, and is configured to deploy from the buckle assembly. The webbing is coupled to the buckle assembly and substantially fixed points disposed on the vehicle, on a seat, or both, so as to restrain the occupant a seat during a dynamic vehicle event. The inflator is configured to deploy the airbag cushion upon occurrence of a dynamic vehicle event.

20 Claims, 8 Drawing Sheets

BUCKLE AIRBAG

CROSS REFERENCE TO RELATED APPLICATIONS

The present application claims priority to and the benefit of U.S. Provisional Patent Application No. 61/289,279 filed on Dec. 22, 2009. The forgoing provisional application is incorporated by reference herein.

BACKGROUND

The present application relates generally to the field of occupant safety devices for use within motor vehicles. More specifically, this application relates to an airbag being configured within a seat belt buckle to improve restraint of the occupant.

DETAILED DESCRIPTION

Airbag modules are located in vehicles to help protect occupants from injury during a dynamic vehicle event, such as an impact or rollover event. An airbag module or system may include an airbag cushion, which deploys during a dynamic vehicle event, whereby inflation gas is rapidly pushed into the inflatable cushion of the airbag system. An airbag module may further include an inflator, which may use a pyrotechnic device or other means to generate inflation gas almost instantaneously and push the gas at a high volumetric flow rate into the inflatable cushion of the airbag system. Airbags are typically stored within and deployed from a component (e.g., seat back or cushion, dashboard, steering assembly) in the vehicle. Airbags are typically packaged through a process of folding and rolling to compact the airbag to fit into the small storage volume provided by the vehicle component. Airbags may be used to provide protection to occupants located in any seating row (e.g., first, second, third) or seating position (e.g., driver-side, passenger-side) of a vehicle. Furthermore, airbags may be tailored to provide protection to any region (e.g., head and neck, torso, pelvis, legs) or more than one region of an occupant.

Figure 1:
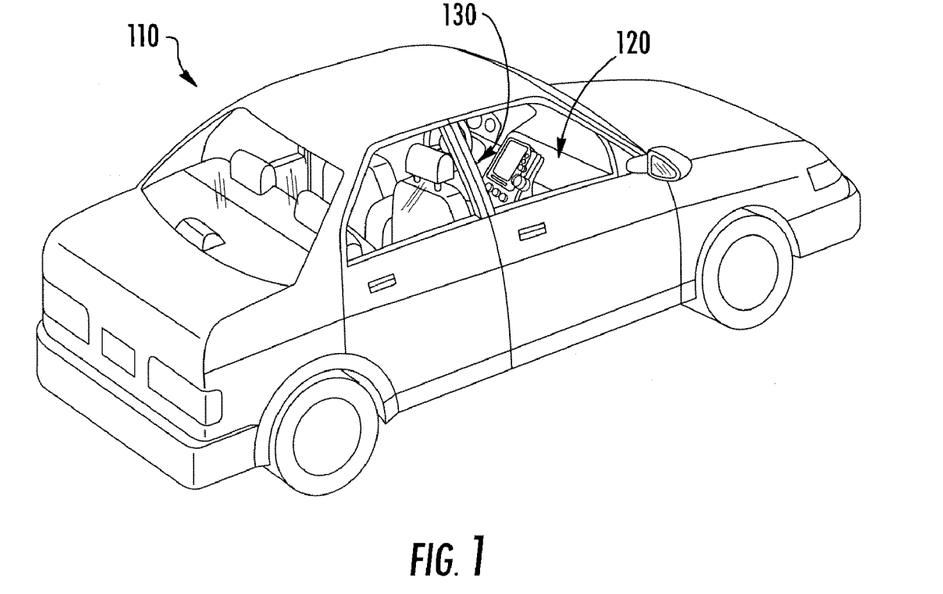
FIG. 1 is a perspective view of an exemplary embodiment of a motor vehicle.

With reference to FIG. 1, an exemplary embodiment of a motor vehicle 110 is illustrated and includes a passenger compartment 120, which may include a seat assembly to provide seating to a vehicle occupant. The passenger compartment 120 may further include an occupant safety mechanism or device 130 (or seat belt assembly) to provide occupant protection by restraining the seat occupant during rapid deceleration of the vehicle, such as a dynamic vehicle event. Those skilled in the art will recognize that the occupant safety mechanism 130 disclosed herein can be included within any motor vehicle (e.g., passenger car, military vehicles, mass-transit vehicles) and may be used to protect any occupant (e.g., driver, front passenger, rear passenger) and are not limited by the illustrations herein.

Figure 2:
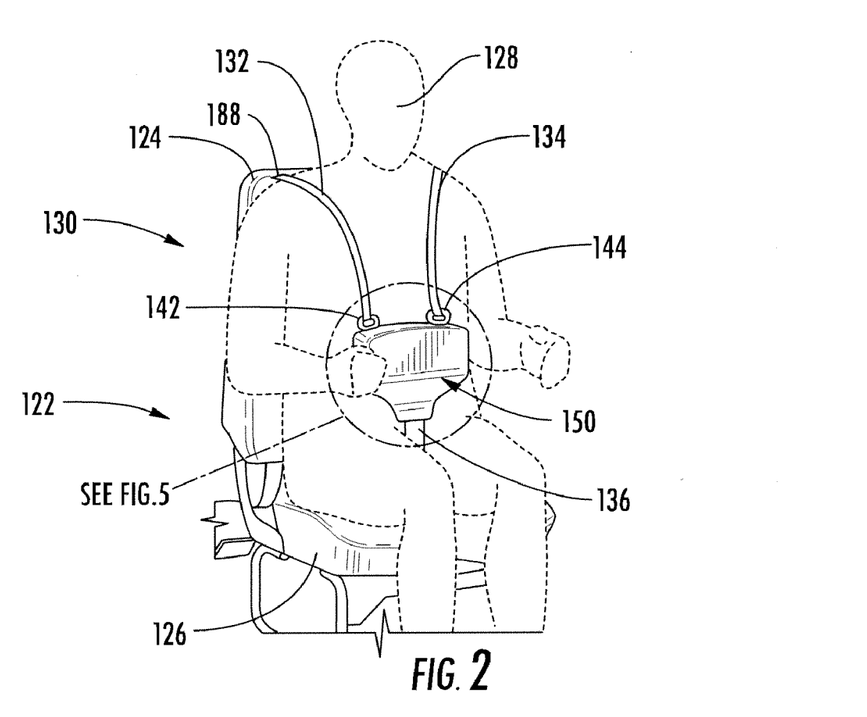
FIG. 2 is a perspective view of an exemplary embodiment of a seat assembly for use in a motor vehicle, which includes an occupant restrained by an occupant safety mechanism having a buckle assembly with an airbag shown folded or undeployed.

With reference to FIG. 2, an exemplary embodiment of a seat assembly 122 is shown to include a seat cushion 126, a seat back 124, and an occupant safety mechanism 130, where the occupant safety mechanism 130 is integrally coupled to the seat assembly 122. For example, the occupant safety mechanism 130 may include one or more retractor mechanisms and/or anchor members which couple directly to the seat assembly 122. The retractor mechanisms and anchor members may further couple to a webbing portion. According to another exemplary embodiment, the occupant safety mechanism 130 may be configured to be separate from the seat assembly 122, meaning that the occupant safety mechanism 130 may work in conjunction with the seat assembly 122 to provide occupant restraint, but may not be integrally coupled to the seat assembly 122. The occupant safety mechanism 130 as configured may stand alone and be coupled to the vehicle directly 110, opposed to being integrated with the seat assembly 122. Additionally, the occupant safety mechanism 130 may be configured to have at least one attachment or coupling to the vehicle 110 and at least one attachment or coupling to the seat assembly 122. For example, the occupant safety mechanism 130 may include a retractor, which may be coupled to the vehicle 110 and a webbing portion, and may further include an anchor member, which may be coupled to the seat assembly 122 and a second webbing portion.

According to an exemplary embodiment, the occupant safety mechanism may be configured as a traditional 3-point system to include a webbing, an anchor, a tongue member, and a buckle assembly. The webbing may include a first end coupled to a substantially fixed first position, which may be positioned substantially near the shoulder of the occupant. The first fixed position may include a retractor mechanism, which may be configured to allow payout (i.e., unwinding) of the webbing, except during rapid decelerations of the vehicle, whereby the retractor may lock to prevent unwinding of the webbing. The webbing may further include a second fixed end coupled to a substantially fixed second position, which may be positioned substantially near the pelvis and off to one side of the occupant. The anchor may provide the substantially fixed second position and may be coupled to the seat assembly or to the vehicle. The tongue member may be configured to slide along the webbing and is configured to selectively couple to the buckle mechanism of the buckle assembly, which may be positioned substantially near the pelvis and off to the side of the occupant opposite to the anchor.

According to another exemplary embodiment, the occupant safety mechanism 130 may be configured as the 3-point system shown in FIG. 2, which may include a first upper webbing portion 132, a second upper webbing portion 134, a lower webbing portion 136, a first tongue member 142, a second tongue member 144, and a buckle assembly 150. The first upper webbing portion 132 may have a first end coupled to the first tongue member 142, and a second end coupled to a substantially fixed position, such as a retractor mechanism or anchor. The second upper webbing portion 134 may have a first end coupled to the second tongue member 144, and a second end coupled to a substantially fixed position, such as a retractor mechanism or anchor. The lower webbing portion 136 (or anchor strap) may have a first end coupled to the buckle assembly 150, and a second end coupled to a substantially fixed position, such as a retractor mechanism or anchor. The first and second tongue members 142, 144 are configured to selectively couple to (or engage) the buckle assembly 150. When the first and second tongue members 142, 144 engage the buckle assembly 150, the first upper webbing portion 132 may wrap around the right shoulder and torso of the occupant 128, the second upper webbing portion 134 may wrap around the left shoulder and torso of the occupant 128, and the lower webbing portion 136 may route between the legs of the occupant 128. Thus, this configuration restrains the occupant 128 to the seat assembly 122.

Figure 9:
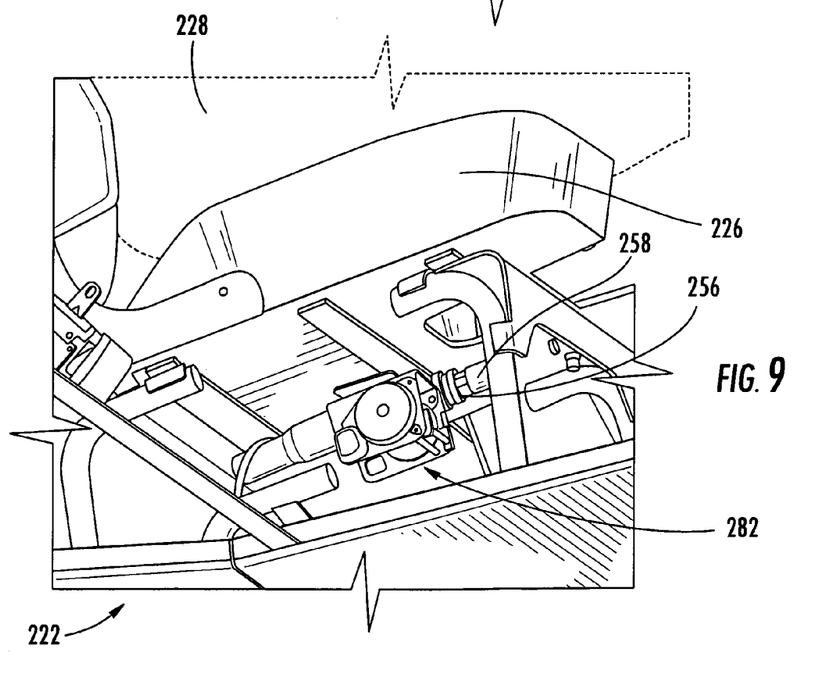
FIG. 9 is a perspective detail view of the lower portion of the seat assembly of FIG. 8 illustrating the inflator coupled to the bottom of the seat cushion pan.
Figure 14:
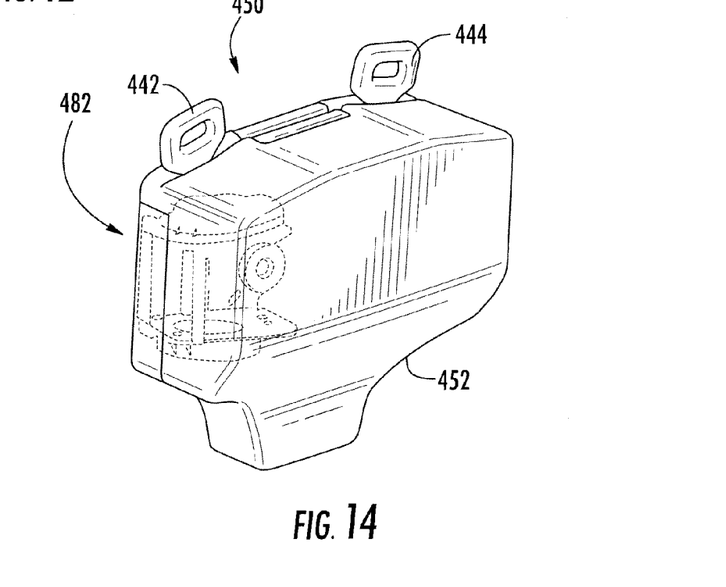
FIG. 14 is a perspective view of another exemplary embodiment of a buckle assembly configured to include an airbag shown folded or undeployed and an internally integrated retractor mechanism.

The occupant safety mechanism may further include one or more biasing means, such as retractor mechanisms, to retract or wind a webbing portion into the retractor about a pivot or axis of rotation. The biasing members provide a tightening effect to the webbing, such that the clearance between the occupant and webbing portions will be substantially eliminated to improve occupant safety by providing improved restraint through permitting less occupant displacement (and hence less occupant momentum during a sudden vehicle deceleration). The biasing means may further be configured to lock the webbing in place relative to the biasing means during a sudden vehicle deceleration, such that extraction (i.e., payout or unwinding) of the webbing is prohibited. A pretensioning function may also be provided by the retractor mechanism or another device that further tightens the webbing around the occupant upon detection of a dynamic vehicle event. The pretensioning function may be provided, for example, through use of a pyrotechnic, motor, or other means configured to quickly retract or otherwise tighten the webbing to the occupant 128. According to an exemplary embodiment, the retractor mechanism may be configured external to the buckle assembly having an incorporated airbag. For example, the retractor 282 may be coupled to the seat back 224, or the seat cushion 226, such as shown in FIG. 9. According to another exemplary embodiment, the retractor 482 may be stored within the buckle assembly 450, such as shown in FIG. 14. The retractor may 482 be coupled to the lower webbing portion, to an upper webbing portion, or may be coupled to any webbing portion.

Those skilled in the art will recognize that buckle assemblies having integrated airbag cushions, as disclosed herein, are not limited to being configured with 3-point occupant safety mechanisms and may be configured with any occupant safety mechanism (e.g., 2-point safety mechanisms used in mass transit vehicles, 5 or 6-point safety mechanism used in racing vehicles, occupant safety mechanisms having more or fewer webbing portions or substantially fixed positions, or occupant safety mechanisms used in different applications). The buckle assemblies having integrated airbag cushions disclosed herein may be used in any safety or seat belt system that provides restraint to occupants, and those illustrations herein are not meant to be limitations.

Sensing and control systems may also be provided that are configured to deploy the airbag cushion. The sensing system, for example, may include various occupant and vehicle sensors arranged in communication with the control system. One or more occupant sensors may be used to determine presence of the occupant and/or classify the occupant 128, such as by weight of the occupant 128. One or more vehicle sensors may be used to detect a dynamic vehicle event. The vehicle sensors may include, for example, one or more accelerometers or gyroscopic sensors, such as a yaw-rate sensor. The control system determines whether to deploy the airbag cushion 154 based on inputs from the sensing system and signals the inflator 156 to deploy the airbag cushion 154. The control system may be an electronic control unit (ECU) or a restraint control module (RCM). The control system may be a modular unit in communication with the sensing system, integrated with the sensing system, or integrated with a broader vehicle control system.

Figure 3:
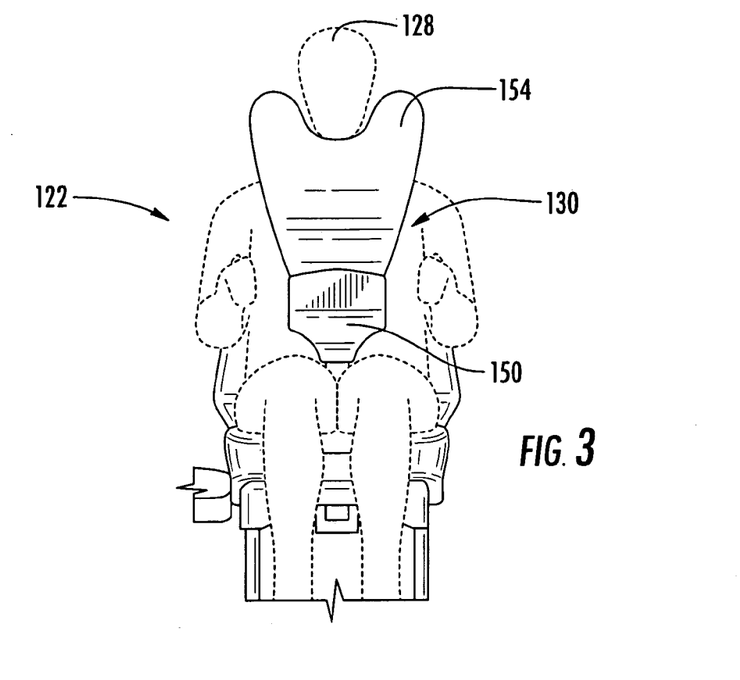
FIG. 3 is a front view of the seat assembly of FIG. 2 with the airbag of the buckle assembly shown deployed or unfolded.
Figure 4:
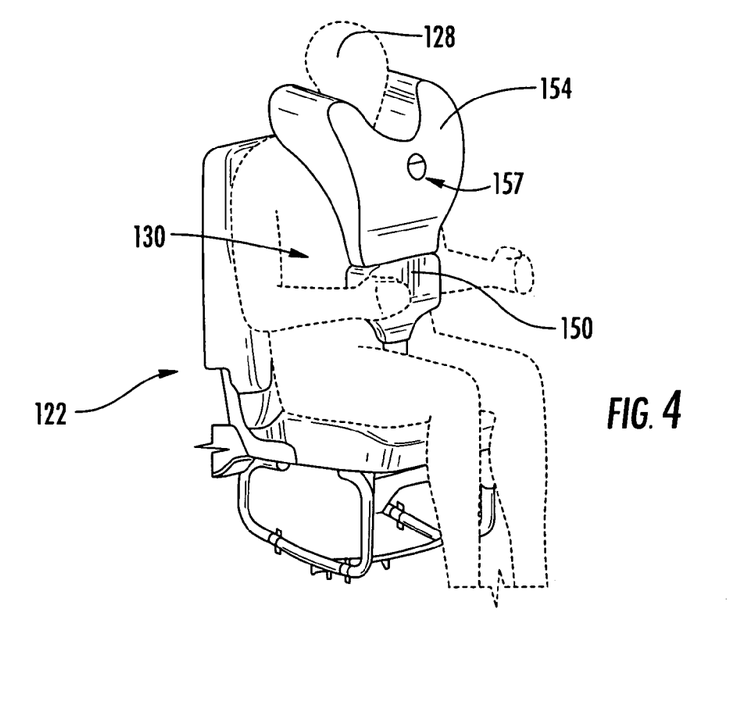
FIG. 4 is a perspective view of the seat assembly of FIG. 3 illustrating the deployed buckle assembly airbag restraining the occupant of the seat assembly.

With reference to FIGS. 3 and 4, an exemplary embodiment of a buckle assembly 150 is illustrated to include an airbag cushion 154, shown deployed (or unfolded) to provide occupant protection to the occupant 128 being restrained by the occupant safety mechanism 130. According to an exemplary embodiment, the airbag cushion 154 is configured to deploy in a substantially upward direction from the buckle assembly 150 towards the torso, neck and head of the occupant 128 being protected to provide primary protection to the thorax and head regions of the occupant 128. The airbag cushion 154 may be made from at least one panel made from any suitable material (e.g., woven fabric), which may be coated using a sealant (e.g., silicone) to prohibit inflation gas from escaping through the porosity of the cushion material. The airbag cushion 154 is configured to be inflatable by having one or more inflatable chambers formed by coupling the one or more cushion panels by any suitable method (e.g., stitching). The airbag cushion may form any shape upon deployment, and may be tailored to provide improved protection for any region of the occupant 128 based on varying customer requirements.

According to one exemplary embodiment, the airbag cushion 154 may be configured to protect one or more body parts of the occupant 128. For example, as shown in FIG. 4, the airbag cushion 154 may have a particular inflated shape or be disposed in a certain position prior to deployment, such as the occupant's 128 front torso and/or along a centerline that generally divides the seat into left and right portions. According to the exemplary embodiment shown in FIG. 4, the deployed airbag cushion 154 may form a singular inflatable chamber having a substantially rectangular or elliptical cross-section through the lower and central portions, which then splits to form two lobes separated by a gap at the upper portion to provide improved protection to the occupant 128. The lower and central portions may have a larger cross-sectional area, relative to the lobes, to provide increased support to the torso of the occupant 128, which has a higher mass relative to the head and neck. Thus, the airbag cushion 154 is tailored to provide higher restraint forces to the higher mass regions of the occupant 154. Additionally, the two lobes of the upper portion are configured to provide lateral support and protection to the head of the occupant 154.

The trajectory and deployment of the airbag cushion 154 may be controlled according to one or more various methods, including packaging of the airbag cushion 154, use of a guide system, use of tethers, and use of an airbag housing. According to one exemplary embodiment, the airbag cushion 154 may be packaged by rolling, folding, vacuum packing, or any combination thereof according to desired deployment characteristics and packaging constraints. According to another exemplary embodiment, the airbag cushion 154 of the buckle assembly 150 may be configured to use at least one upper webbing portion 132, 134 as a guide to aid the airbag 154 to deploy properly. The webbing portion 132, 134 may help route the airbag deployment, so that the airbag cushion 154 deploys substantially upward from the buckle assembly 150 towards the head of the occupant 128, expanding to protect the torso of the occupant 128. The guide system may generally be external to the buckle assembly 150, such as a ring 155 that is attached to one or both of the upper webbing portions 132, 134 after the upper webbing portions 132, 134 are attached to the buckle assembly 150. The guide system may instead, prior to deployment of the airbag cushion, be generally internal to the buckle assembly 150. According to another exemplary embodiment, tethers may be used to control deployment of the airbag cushion 154. Tethers act as a restraint on the airbag cushion 154 to control the shape, position, and trajectory of the airbag cushion 154 upon deployment. According to another exemplary embodiment, an airbag housing 186 may be provided to direct the airbag cushion 154 from the buckle assembly 150 and provide a surface from which the airbag cushion 154 may extend. The airbag housing 186 may be made from any material of sufficient strength from which the airbag cushion 154 can deploy, such as steel or a composite with glass or nylon fibers.

Figure 5:
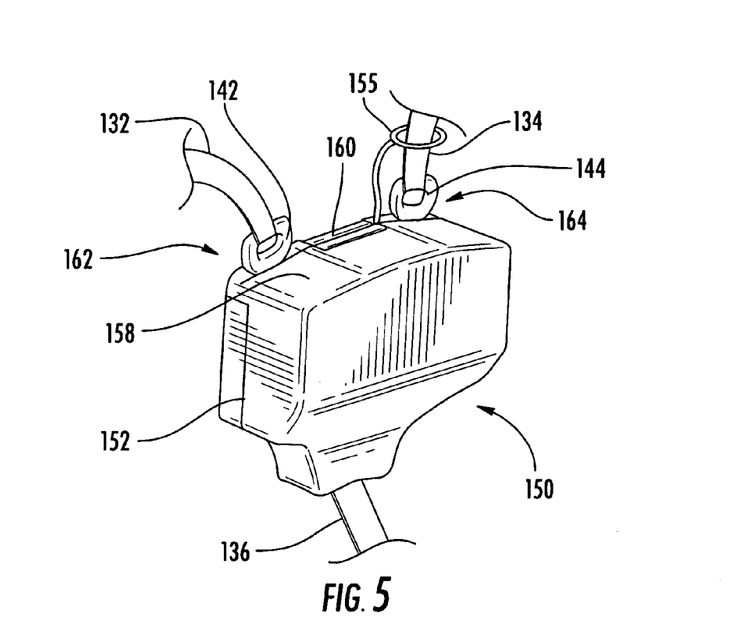
FIG. 5 is a perspective detail view of the front of the exemplary embodiment of the buckle assembly of FIG. 2 configured to include an airbag, which is shown folded or undeployed.
Figure 6:
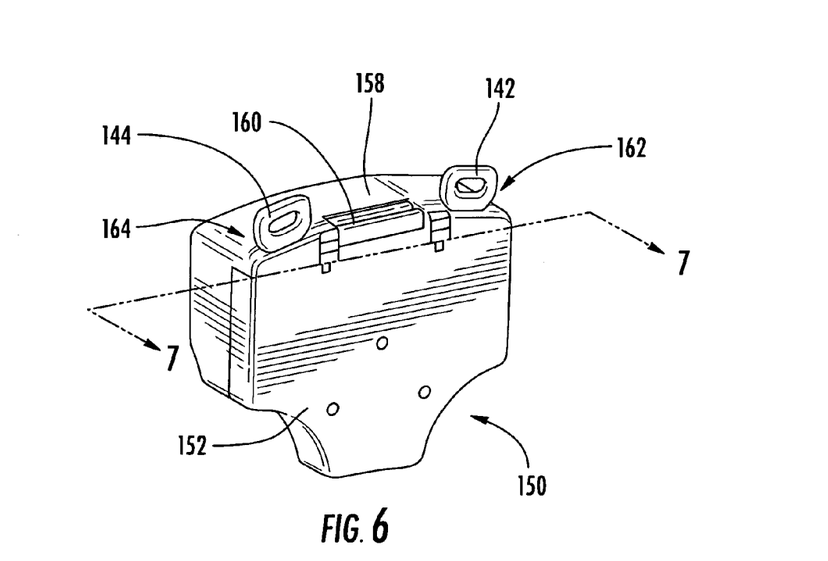
FIG. 6 is a perspective view of the rear of the buckle assembly of FIG. 5.
Figure 7:
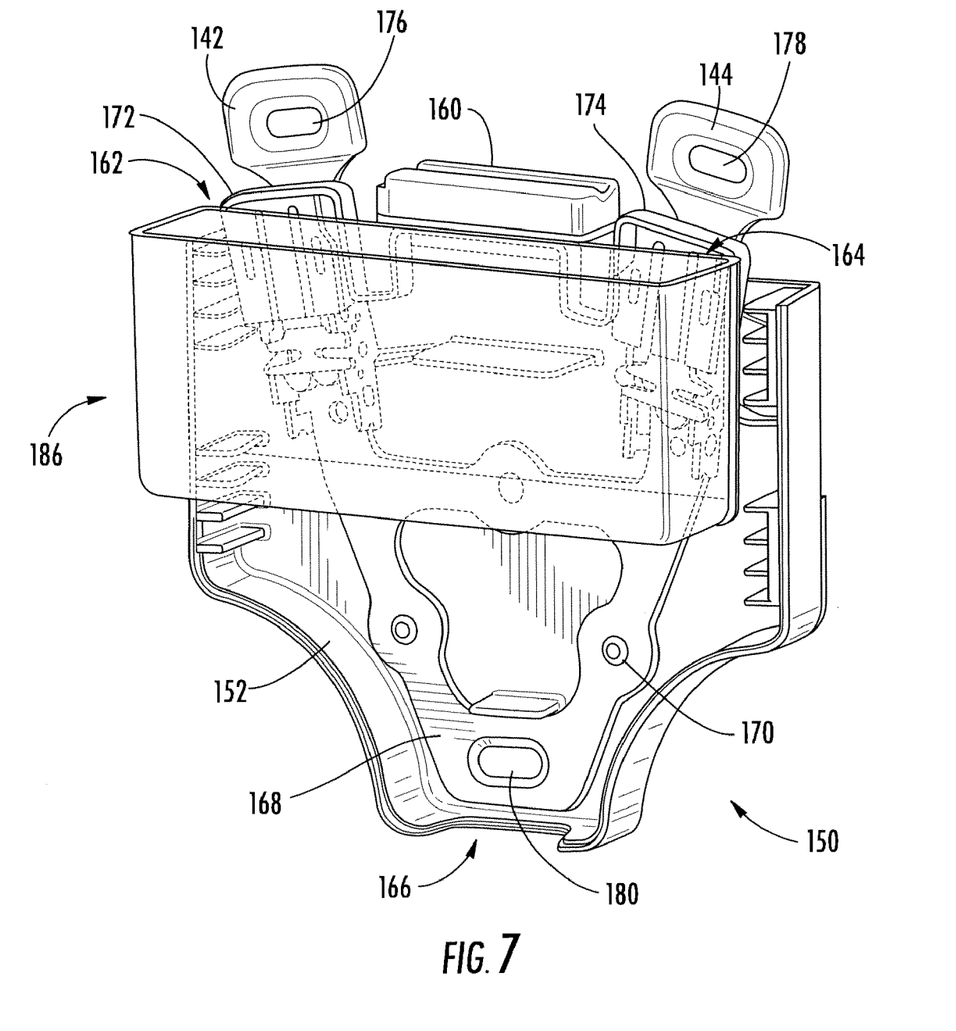
FIG. 7 is a sectional view of the buckle assembly of FIG. 6, taken along line 7-7.

With reference to FIGS. 5-7, an exemplary embodiment of a buckle assembly 150 is illustrated to include an airbag cushion 154, a housing 152, a support member 168, a first buckle mechanism 172, a second buckle mechanism 174, and a release button 160. The first and second buckle mechanisms 172, 174 may be configured according to conventional methods to permit selective coupling of a tongue member 142, 144. According to an exemplary embodiment, the buckle assembly 150 may be configured to have the two buckle mechanisms 172, 174 operatively coupled to and separated by the release button 160, so that depressing (i.e., a predetermined displacement in the direction into the buckle assembly 150) the release button 160 triggers the substantially simultaneous release (i.e., decoupling or disengagement) of the first and second tongue members 142, 144 from the first and second buckle mechanisms 172, 174, respectively. The release button 160 may be made from any polymer made by injection molding, or may be made of any suitable material through any suitable process, which provides the durability required for repetitive use.

The support member 168 may be made from steel or any other suitable material, which provides structural support to the buckle assembly 150, and is capable of withstanding the high tension loads. According to an exemplary embodiment, the support member 168 may be a plate configured substantially as an "A" shape to provide the required strength in an efficient (e.g., low mass) manner. Each leg of the support member 168 allows for coupling of a buckle mechanism 172, 174, and provides structural support to the buckle assembly 150 and retains each buckle mechanism 172, 174 when subjected to loading, such as from the forces imparted into the occupant safety system 130 induced by the occupant 128 during sudden vehicle deceleration. The apex of the "A" shaped support member 168 may include a slot 180 for coupling the lower webbing portion 136. The slot 180 may be configured to reduce or eliminate the wear on the coupled webbing, for example, by having edges that are beveled or coined. The support member 168 may further include one or more attachment members, such as holes or extruded holes, which allow coupling of the support member 168 to the housing through coupling means 170. The coupling means may be a traditional fastener (e.g., screw, rivet, bolt) or it may be any suitable method for coupling the support member 168 to the housing 152. According to other exemplary embodiments, the support member 168 may have a different configuration according to other requirements, such as packaging constraints, number of webbing portions, etc. For example, a 5-point occupant safety mechanism may include a support member that is generally star-shaped, polygonal, or circular.

The housing 152 forms the protective covering for the airbag 154 and buckle assembly 150, and further provides integration of the buckle assembly 150 by allowing attachment of the first and second buckle mechanisms 172, 174, release button 160, and support member 168. According to an exemplary embodiment, the housing 152 may be made from a first housing portion and a second housing portion, which may be made from any suitable material (e.g., polymer, composite). The first and second housing portions may be coupled together or may be integrally formed to retain the buckle mechanisms 172, 174, support member 168, release button 160, and airbag cushion 154. According to other exemplary embodiments, the housing 152 may be made from one or a plurality of portions. According to an exemplary embodiment, the housing 152 may form a first aperture 162 to permit access of the first tongue mechanism 142 to the first buckle mechanism 172, a second aperture 164 to permit access of the second tongue 144 mechanism to the second buckle mechanism 174, and a third aperture 166 to permit access of the lower webbing portion 136 to be coupled to the support member 168.

The housing 152 may further be configured to include an airbag breaching surface 158, which may be configured to permit the airbag 154 to breach the housing during deployment with little resistance to allow proper airbag deployment. The housing 152 and breaching surface 158 may be configured to help direct the deploying airbag cushion 154 into a properly deployed position while avoiding the release button 160 and vitals of the buckle mechanisms 172, 174. The airbag breaching surface 158 may be configured to include thinner walls or portions having thinner sections, to allow the housing 152 to deform from forces imparted by the deploying airbag 154 created by the increasing internal pressure of the airbag cushion 154. The housing 152 may also include a plurality of strengthening or stiffening ribs to provide improved durability and structural support to the buckle assembly 150. The housing may further include at least one attachment means for coupling of the support member 168. The attachment means may be holes in the housing, which permit fasteners to pass through, may be extruded portions, which engage holes in the support member 168, or may be any suitable method for providing attachment of the housing 152 and support member 154.

Figure 11:
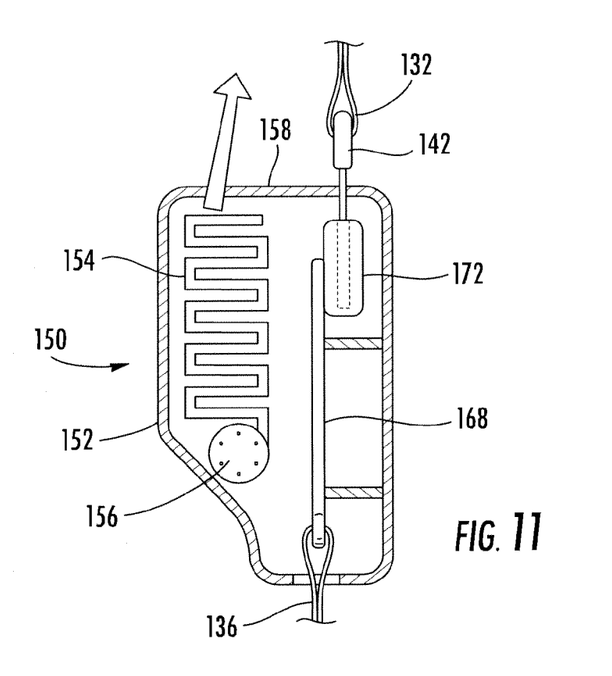
FIG. 11 is a sectional view of an exemplary embodiment of a buckle assembly having an airbag and an internally integrated inflator.

The buckle assembly 150 may further include an inflator 156 to provide inflation gas to deploy the airbag cushion 154. According to an exemplary embodiment, the inflator 156 may be stored within the housing 152 of the buckle assembly 150 and be coupled directly to the folded airbag cushion 154, as shown in FIG. 11. Thus, when the inflator 156 is triggered to deploy, the inflation gas is pushed directly into the inflatable chamber or chambers of the airbag cushion 154, which increases the internal pressure of the cushion 154 causing it to breach the housing 152 and deploy to provide occupant protection. The inflator 156, for example, may be a pyrotechnic device, or a compressed gas device that is either prefilled or refillable, such as by a vehicle compressor.

Figure 8:
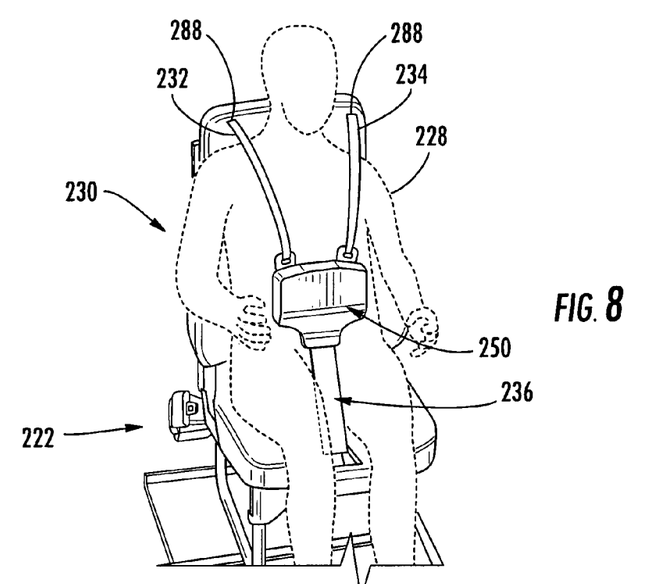
FIG. 8 is a perspective view of another exemplary embodiment of a seat assembly with an occupant restrained by an occupant safety mechanism having a buckle assembly with an airbag shown folded or undeployed, and further having an external inflator coupled to the seat cushion of the seat assembly.
Figure 10:
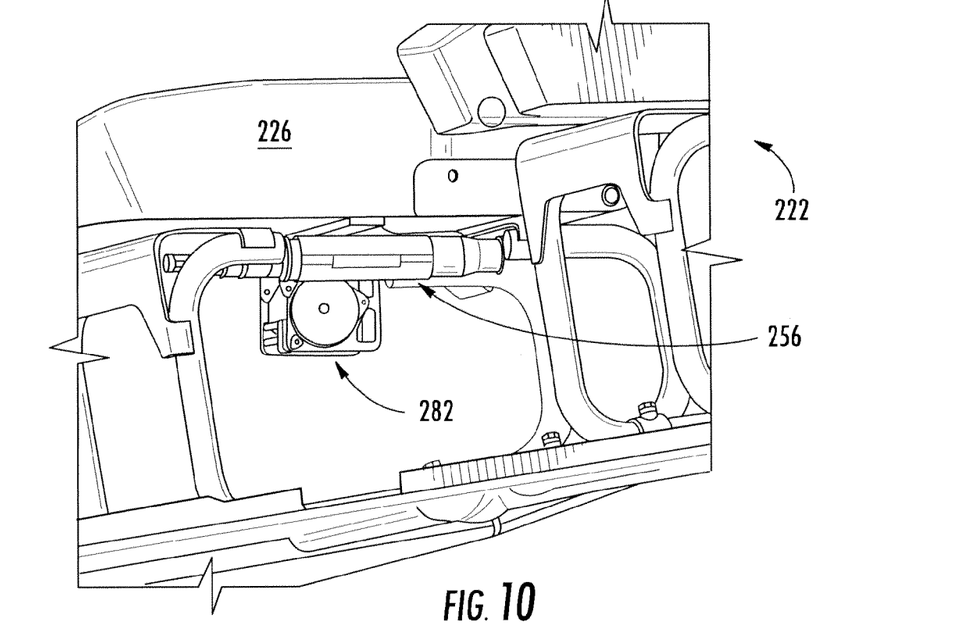
FIG. 10 is another perspective detail view of the seat assembly of FIG. 8 illustrating the inflator coupled to the bottom of the seat cushion pan.
Figure 12:
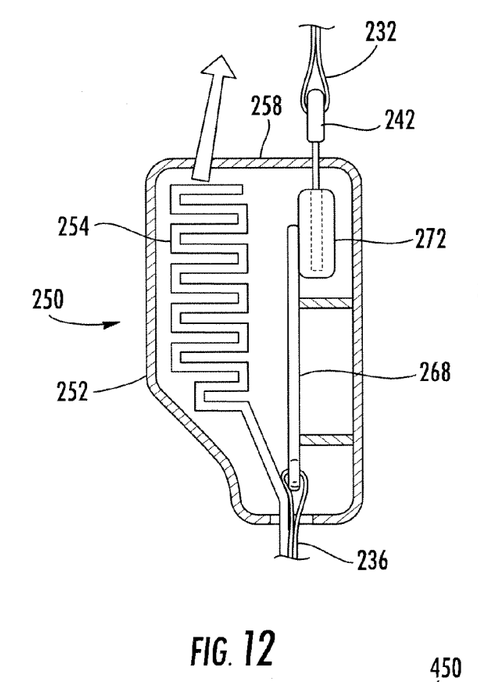
FIG. 12 is a sectional view of another exemplary embodiment of a buckle assembly having an airbag and an externally integrated inflator.

With reference to FIGS. 8-10, another exemplary embodiment of a buckle assembly 250 is shown, which includes an inflator 250 external to the housing 252. According to an exemplary embodiment, the inflator 256 may be coupled to the seat assembly 222, such as the seat cushion 226, and may be coupled to the airbag cushion 254 through an airbelt. For example, the externally integrated inflator 256 may be coupled to the seat pan of the seat cushion 226 using any suitable fastener. According to other exemplary embodiments, the inflator 256 may be coupled to any suitable vehicle component, such as the floor pan, and the inflator 256 may be coupled to the airbag cushion 254 by any suitable means for delivering high pressure inflation gas to the cushion 254. As shown in FIG. 12, the airbelt (or other means of delivering gas) may be coupled to the folded airbag cushion 254 in the housing 252, to provide protection to the coupling. The airbelt, for example, may comprise airbag material interposed between layers of webbing so as to provide a conduit 258 for fluidic communication between the inflator 256 and the airbag cushion 254. Alternatively, a tube or other conduit may be disposed between the inflator 256 and airbag cushion 254.

Figure 13:
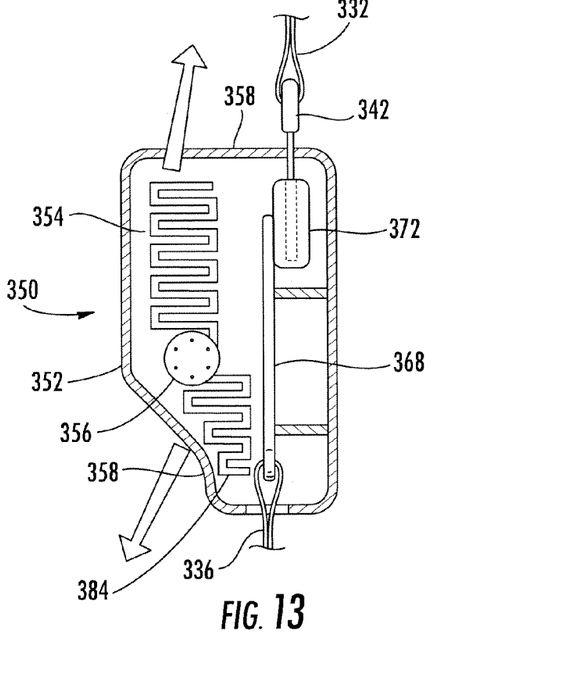
FIG. 13 is a sectional view of another exemplary embodiment of a buckle assembly having multiple airbag cushions and an internally integrated inflator.

With reference to FIG. 13, another exemplary embodiment of a buckle assembly 350 is shown to include a first airbag 354 and a second airbag 384. For example, the buckle assembly 350 may include a first airbag cushion 354 configured to provide protection to the thorax and head of the occupant and a second airbag cushion 356 configured to provide protection to another portion of the occupant, such as the lower limb or pelvis. The buckle assembly 350 may include a single inflator 356, as shown in FIG. 12, which may be configured to provide inflation gas to both airbag cushions 354, 384, when triggered for deployment. The housing 352 may be configured to provide for more than one breaching surface 358 to allow the airbag cushions 354, 384 to breach the buckle assembly 350 at different locations. Those skilled in the art will recognize that a buckle assembly 350 may be configured with any number of airbag cushions 354, in which each airbag 354 may be tailored to meet varying customer requirements and may provide protection to a similar or a different portion (e.g., head, torso, lower limb) of the occupant. Those skilled in the art will also recognize that a buckle assembly 350 may be configured with more than one inflator 356, in which the inflators 356 may be positioned external to the housing 352, internal to the housing 352, or a combination of internal and external.

According to another exemplary embodiment, the airbag cushion is configured to protect the occupant's lower body parts, such as its pelvis or legs. The airbag cushion may be particularly shaped to protect the occupants' lower body parts against impact to interior portions of the vehicle and may deploy in a generally forward and/or downward direction from the buckle assembly. According to one exemplary embodiment, the airbag cushion may also or instead be configured to protect the occupant's side. The airbag cushion may have a particular shape to generally wrap around the occupant and may deploy in a generally sideward direction from the buckle assembly.

According to one exemplary embodiment, the airbag cushion may be configured to protect occupants of different shape and size. For example, the airbag cushion may include passive venting 157 configured to alter the shape of the airbag cushion depending on the size or shape of the occupant. Depending on characteristics of the occupant, passive vents are configured to remain closed or open to release inflation gas and alter the shape of the airbag cushion. For example, the passive vents may be configured to open upon encountering certain body parts, such as a shorter occupant's chin, and thereby alter the shape of the airbag cushion to more ably protect shorter occupants. The passive vents are further configured to remain closed to protect taller occupants. According to another exemplary embodiment, one or more inflators are configured to selectively discharge based on one or more characteristics of the occupant. For example, an occupant detection system may detect and classify the occupant based on its size or weight, and the inflator may be configured to selectively discharge a smaller amount of inflation gas for smaller or lighter occupants and a larger amount of inflation gas for larger or heavier occupants.

The buckle assemblies as disclosed herein are configured to provide improved occupant protection. Protection of the head and neck of an occupant may be improved by having an airbag cushion that can deploy in a relative shorter time due to the reduced deployment distance and reduced inflatable volume than conventional airbag cushions, which may deploy from a dashboard or steering column. For example, according to an exemplary embodiment, the volume of the inflatable cushion used in buckle assembly was between 20 and 25 liters, which is about one-third the volume of a typical driver airbag deployed from the steering column and about one-sixth the volume of a typical passenger airbag deployed from the dashboard. In addition to reducing the deployment time, this reduced volume allows for smaller inflators and reduced cost. Further, for occupants that wear helmets, such as race-car drivers or military personnel, the added mass of the helmet can increase the potential for neck injury by increasing forces from sudden vehicle decelerations. The buckle assemblies disclosed herein can reduce the potential of neck injuries to those occupants wearing helmets by providing additional support to the head and neck regions and by providing such support earlier in the vehicle impact.

An additional benefit provided by the buckle assemblies having airbags, as disclosed herein, is that the improved protection may be provided for an increased number of crash modes. For example, a conventional dashboard deployed passenger airbag may provide optimal protection for frontal impacts, where the buckle assemblies disclosed herein may provide optimal protection during frontal impacts, side impacts, and rollover events. Additionally, by providing a more efficient method of occupant protection, such as from having a relative lower inflatable volume, the packaging impact on the vehicle can be reduced as well.

Furthermore, because the airbag cushion is disposed within the buckle assembly, the airbag cushion may be disposed in positions defined relative to the occupant instead of a fixed position within the vehicle. Accordingly, the occupant safety mechanism and buckle assembly, include the airbag cushion, may be configured to particular applications, including unconventional vehicle seating arrangements.

According to one exemplary embodiment, the occupant safety mechanism is configured for those with compromised mobility, such as those using mobilized or auxiliary seating. Occupants must often remain in auxiliary seating, such as a wheelchair or motorized scooter, when riding in a motor vehicle and may not be in an optimal position relative to a vehicle's airbags to be protected during a dynamic vehicle event. By providing an airbag cushion in a buckle assembly, the airbag cushion may be positioned relative to occupant as opposed to being in a fixed location within the vehicle.

Figure 15:
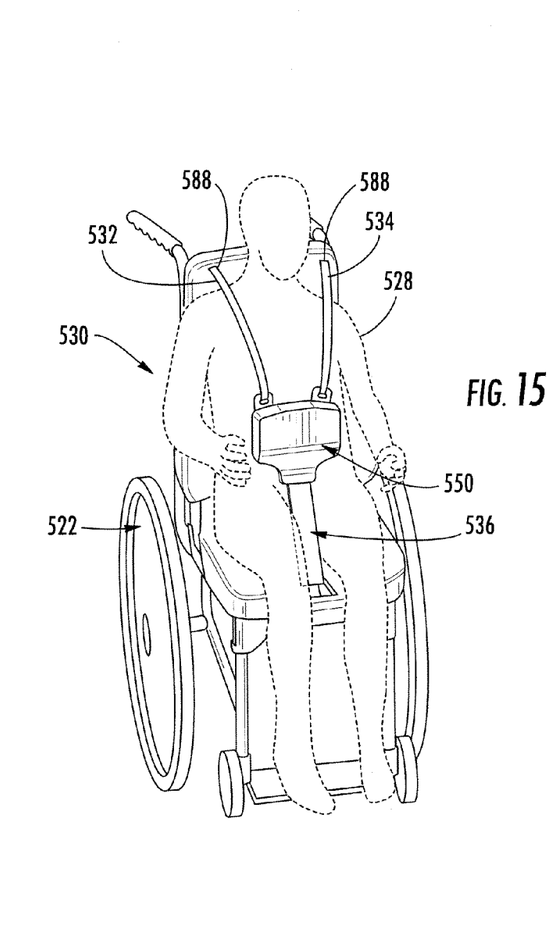
FIG. 15 is a perspective view of another exemplary embodiment of a buckle assembly configured to include an airbag shown folded or undeployed.

According to one exemplary embodiment, the buckle assembly 550, including the airbag cushion, is part of an auxiliary seating system including an auxiliary seat, such as a wheelchair 522, wherein the occupant safety mechanism 530 and buckle assembly 550 are provided with and coupled directly to the auxiliary seat 522. The webbing 532, 534, 536 of the occupant safety mechanism 530 may, for example, form a 3-point restraint and be attached to the auxiliary seat 522 at substantially fixed positions 588 with anchors or retractor mechanisms. The auxiliary seat 522 is removable from the vehicle and is configured to be releasably coupled to the vehicle, for example, by using removable straps, fasteners, or a coupling device. The control system for the airbag cushion may be integral to the occupant safety mechanism 530 or buckle assembly 550, or the airbag cushion may be controlled by the vehicle's control system, such as through wired or wireless communication.

Figure 16:
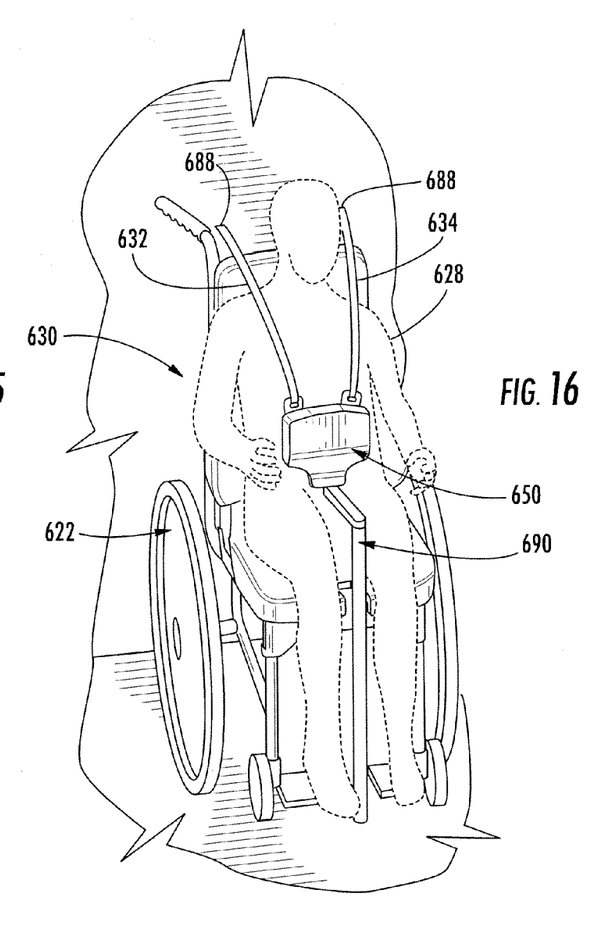
FIG. 16 is a perspective view of another exemplary embodiment of a buckle assembly configured to include an airbag shown folded or undeployed.

According to another exemplary embodiment, the occupant safety mechanism 630 and buckle assembly 650, including the airbag cushion, are provided with and coupled directly to the vehicle. The vehicle, occupant safety mechanism 650, and buckle assembly 630 are configured to accommodate the occupant 628 and wheelchair 622. For example, the wheelchair 622 is restrained in the vehicle in a position proximate the occupant safety mechanism 630. Webbing portions 632, 634 of the occupant safety mechanism 630 are coupled directly to substantially fixed positions 688 on the vehicle, such as by anchors or retractor mechanisms. A lower webbing portion may couple the buckle assembly 650 to the vehicle, or the buckle 650 assembly may alternatively be provided by an arm 690, fixed or adjustable, that extends vertically from the vehicle's floor to between the occupant's legs. The wheel chair 622 may provide a cutout between the occupants legs such that the occupant may be moved proximate the arm 690 and buckle assembly 650, or a fixed or adjustable horizontal arm may allow the buckle assembly 650 to be positioned proximate the occupant 628.

According to another exemplary embodiment, the occupant safety mechanism, including the buckle assembly, may be coupled directly to both the wheelchair and motor vehicle. For example, a 3-point occupant safety mechanism may include a lower webbing portion coupled directly to the vehicle by a retractor mechanism and first and second upper webbing portions coupled directly to the wheelchair by retractor mechanisms.

According to another exemplary embodiment, the occupant safety mechanism and buckle assembly, including the airbag cushion, may be provided as a modular system, separate from the wheel chair and motor vehicle. For example, a modular 5-point occupant safety mechanism may include lower and upper webbing portions configured to be selectively coupled to various substantially fixed positions that may be available on a seat or on the vehicle. The occupant safety mechanism may include its own control system or be in communication with the vehicle control system.

According to another exemplary embodiment, the occupant safety mechanism is configured for emergency response personnel, such as those riding in an ambulance or fire truck. Emergency response personnel are often seated in varied and changing positions, such as when moving about the vehicle or facing toward the side or rear of a vehicle. The occupant safety mechanism and buckle assembly, including the airbag cushion, may be provided for a rear or side facing seat. For example, a 3-point safety system may be provided having a lower webbing portion coupled to a seat bottom, such as by an anchor or retractor mechanism, and upper webbing portions coupled to a seat back that may be formed by a rearward or side facing interior wall of the ambulance.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the buckle assemblies as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A safety mechanism for an occupant seated on a seat of a vehicle, comprising:
    a tongue connected to a webbing;
    a buckle assembly configured to be coupled to the tongue to thereby secure the webbing in front of the occupant;
    wherein the buckle assembly includes an inflatable airbag and an inflator for generating inflation gas for the airbag;
    where the buckle assembly is configured to be positioned along a centerline that divides the seat into left and right portions; and
    wherein the airbag is positioned and configured to deploy upwardly from within the buckle assembly to a deployed position in front of the occupant.

2. The safety mechanism of claim 1, wherein the webbing comprises a plurality of webbing portions, each webbing portion coupled to at least one substantially fixed position and the buckle assembly, wherein each webbing portion is configured to pass over a shoulder of the occupant.

3. The safety mechanism of claim 2, wherein at least one substantially fixed position is disposed on the vehicle.

4. The safety mechanism of claim 2, wherein at least one substantially fixed position is disposed on the seat.

5. The safety mechanism of claim 4, wherein the seat is configured to releasably couple to the vehicle.

6. The safety mechanism of claim 1, wherein the buckle assembly includes a housing containing the airbag and inflator and wherein the housing is configured to open to allow the airbag to deploy into the deployed position.

7. The safety mechanism of claim 6, wherein the airbag is configured so that the deployed position includes inflated portions of the airbag located on both left and right sides of the occupant's head.

8. A safety mechanism for an occupant of a vehicle, comprising:
    a pair of webbing portions configured to restrain the occupant, wherein each of the webbing portions is configured to pass over a shoulder of the occupant;
    a buckle assembly for securing the webbing portions when the occupant is positioned in a seat;
    an inflator;
    wherein buckle assembly includes a housing containing an airbag cushion, and at least one buckle mechanism for connecting the webbing portions to the buckle assembly;
    wherein the inflator is configured to provide inflation gas for inflating the airbag cushion upon occurrence of a dynamic vehicle event; and
    wherein the airbag cushion is configured to deploy upwardly in front of the chest of the occupant.

9. The safety mechanism of claim 8, wherein the inflator is contained within the housing.

10. The safety mechanism of claim 8, wherein the inflator is disposed outside the housing, and a conduit is disposed between the airbag cushion and the inflator for fluidic communication therebetween.

11. The safety mechanism of claim 10, wherein the inflator is disposed on the seat.

12. The safety mechanism of claim 8, wherein the airbag cushion comprises a passive venting system configured to vent inflation gas from the airbag cushion based upon a characteristic of the occupant.

13. The safety mechanism of claim 12, further comprising a guide system configured to guide the airbag cushion during inflation of the airbag cushion.

14. The safety mechanism of claim 13, wherein the inflator is configured in fluidic communication with the airbag cushion by a conduit interposed between the inflator and the airbag cushion.

15. The safety mechanism of claim 13, wherein the housing is configured to open to allow the airbag cushion to breach the housing during inflation of the airbag cushion.

16. The safety mechanism of claim 8, wherein the buckle assembly is anchored to the vehicle by a strap configured to pass between the legs of the occupant.

17. A seat belt assembly for restraining an occupant of a vehicle, comprising:
    a pair of webbing portions, wherein each webbing portion is configured to pass over a shoulder of the occupant and wherein each webbing portion is connected to a tongue member;
    a buckle assembly anchored to the vehicle configured to releasably connect to each of the tongue members to secure the shoulder webbing portions in position;
    wherein the buckle assembly includes an inflator and an airbag cushion, and
    wherein the inflator is configured to provide gas for inflating the airbag cushion, the airbag cushion is configured to inflate and deploy out of the buckle assembly into a position in front of the occupant.

18. The seat belt assembly of claim 17, further comprising an anchor strap for connecting the buckle assembly to the vehicle, wherein the anchor strap is anchored to the vehicle so that the strap passes between the occupant's legs.

19. The seat belt assembly of claim 17, further comprising a vertical arm for connecting the buckle assembly to the vehicle, wherein the arm is anchored to the vehicle and extends generally vertically so that the arm passes between the occupant's legs.

20. The seat belt assembly of claim 17, further comprising a horizontal arm for connecting the buckle assembly to the vehicle, wherein the arm is anchored to the vehicle and extends generally horizontally to position the buckle assembly in front of the occupant.

* * * * *